(12) United States Patent
Courtion et al.

(10) Patent No.: US 7,917,432 B2
(45) Date of Patent: Mar. 29, 2011

(54) DUAL CARD

(75) Inventors: Colette Courtion, Seattle, WA (US); Mary Stumpf, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 977 days.

(21) Appl. No.: 10/943,109

(22) Filed: Sep. 16, 2004

(65) Prior Publication Data

US 2005/0077350 A1 Apr. 14, 2005

Related U.S. Application Data

(63) Continuation of application No. PCT/IB03/04512, filed on Oct. 13, 2003.

(60) Provisional application No. 60/511,068, filed on Oct. 14, 2003.

(51) Int. Cl.
*G06Q 40/00* (2006.01)

(52) U.S. Cl. .................................................... 705/39

(58) Field of Classification Search ............... 705/35–44
See application file for complete search history.

(56) References Cited

U.S. PATENT DOCUMENTS

| | | | |
|---|---|---|---|
| 4,973,828 A | 11/1990 | Naruse et al. | |
| 5,025,138 A | 6/1991 | Cuervo | |
| 5,223,699 A | 6/1993 | Flynn | |
| 5,276,311 A | 1/1994 | Hennige | |
| 5,409,092 A | 4/1995 | Itako et al. | |
| 5,440,108 A | 8/1995 | Tran et al. | |
| 5,506,393 A | 4/1996 | Ziarno | |
| 5,521,966 A | 5/1996 | Friedes | |
| 5,577,109 A | 11/1996 | Stimson et al. | |
| 5,578,808 A | 11/1996 | Taylor | |
| 5,590,038 A | 12/1996 | Pitroda | |
| 5,684,291 A | 11/1997 | Taskett | |
| 5,689,100 A | 11/1997 | Carrithers et al. | |
| 5,696,908 A | 12/1997 | Muehlberger et al. | |
| 5,704,046 A * | 12/1997 | Hogan ........................ | 705/39 |
| 5,744,787 A | 4/1998 | Teicher | |
| 5,819,234 A | 10/1998 | Slavin et al. | |
| 5,844,230 A | 12/1998 | Lalonde | |
| 5,923,016 A | 7/1999 | Fredregill et al. | |

(Continued)

FOREIGN PATENT DOCUMENTS

CN 1384652 A 5/2001

(Continued)

OTHER PUBLICATIONS

"Visa International Launches Major Smart Card Program in Leading Shopping and Entertainment District in Tokyo" (PR Newswire, Jul. 15, 1998).*

(Continued)

*Primary Examiner* — Olabode Akintola
(74) *Attorney, Agent, or Firm* — Knobbe Martens Olson & Bear LLP

(57) ABSTRACT

A dual card, which facilitates payment for goods or services from either a credit account or a stored value account, operates on both an open network and a closed network. The dual card is a payment card that integrates the ability to provide credit privileges and stored value privileges to a cardholder of the dual card. The features, benefits, and advantages of a stored value card are integrated with the credit card aspects of the dual card. The benefits, features, and advantages of a credit card are integrated with a stored value card.

12 Claims, 15 Drawing Sheets

U.S. PATENT DOCUMENTS

| | | |
|---|---|---|
| 5,937,391 A | 8/1999 | Ikeda et al. |
| 5,953,710 A | 9/1999 | Fleming |
| 5,956,695 A | 9/1999 | Carrithers et al. |
| 5,969,318 A | 10/1999 | Mackenthun |
| 5,991,413 A | 11/1999 | Arditti et al. |
| 5,991,748 A | 11/1999 | Taskett |
| 6,000,608 A | 12/1999 | Dorf |
| 6,032,136 A | 2/2000 | Brake, Jr. et al. |
| 6,032,859 A | 3/2000 | Muehlberger et al. |
| 6,038,552 A | 3/2000 | Fleischl et al. |
| 6,044,362 A * | 3/2000 | Neely .............. 705/34 |
| 6,105,009 A | 8/2000 | Cuervo |
| 6,138,911 A | 10/2000 | Fredregill et al. |
| 6,152,365 A | 11/2000 | Kolls |
| 6,167,387 A * | 12/2000 | Lee-Wai-Yin .......... 705/41 |
| 6,167,389 A | 12/2000 | Davis et al. |
| 6,189,787 B1 | 2/2001 | Dorf |
| 6,193,155 B1 * | 2/2001 | Walker et al. ............... 235/381 |
| 6,199,757 B1 | 3/2001 | Kubert |
| 6,282,566 B1 | 8/2001 | Lee, Jr. et al. |
| 6,330,978 B1 | 12/2001 | Molano et al. |
| 6,375,073 B1 | 4/2002 | Aebi et al. |
| 6,405,182 B1 | 6/2002 | Cuervo |
| 6,405,930 B1 | 6/2002 | Kubert |
| 6,427,909 B1 | 8/2002 | Barnes et al. |
| 6,484,147 B1 | 11/2002 | Brizendine et al. |
| 6,502,745 B1 | 1/2003 | Stimson et al. |
| 6,561,416 B2 | 5/2003 | Kubert et al. |
| 6,575,361 B1 | 6/2003 | Graves et al. |
| 6,581,845 B2 | 6/2003 | Ye |
| 6,594,640 B1 | 7/2003 | Postrel |
| 6,612,487 B2 * | 9/2003 | Tidball et al. ............... 235/380 |
| 6,615,189 B1 | 9/2003 | Phillips et al. |
| 6,615,190 B1 | 9/2003 | Slater |
| 6,631,849 B2 | 10/2003 | Blossom |
| 6,655,587 B2 | 12/2003 | Andrews et al. |
| 6,685,088 B1 | 2/2004 | Royer et al. |
| 6,700,961 B1 | 3/2004 | Dacloush et al. |
| 6,705,518 B2 | 3/2004 | Park et al. |
| 6,915,277 B1 * | 7/2005 | Manchester et al. ............ 705/39 |
| 7,010,512 B1 | 3/2006 | Gillin et al. |
| 7,083,084 B2 | 8/2006 | Graves et al. |
| 7,101,512 B2 | 9/2006 | Hahs |
| 7,130,828 B2 * | 10/2006 | Phillips et al. ............... 705/41 |
| 7,406,442 B1 * | 7/2008 | Kottmeier et al. ............. 705/35 |
| 7,430,521 B2 | 9/2008 | Walker et al. |
| 2001/0001321 A1 * | 5/2001 | Resnick et al. ............... 705/17 |
| 2001/0047342 A1 | 11/2001 | Cuervo |
| 2001/0048023 A1 | 12/2001 | Fitzmaurice et al. |
| 2001/0054003 A1 | 12/2001 | Chien et al. |
| 2002/0022966 A1 | 2/2002 | Horgan |
| 2002/0026418 A1 | 2/2002 | Koppel et al. |
| 2002/0049631 A1 | 4/2002 | Williams |
| 2002/0052838 A1 | 5/2002 | Yamada et al. |
| 2002/0066783 A1 | 6/2002 | Sawin |
| 2002/0069122 A1 | 6/2002 | Yun et al. |
| 2002/0091572 A1 | 7/2002 | Anderson et al. |
| 2002/0116324 A1 | 8/2002 | Macias |
| 2002/0138343 A1 | 9/2002 | Weatherford et al. |
| 2002/0138428 A1 * | 9/2002 | Spear .............. 705/41 |
| 2002/0145051 A1 * | 10/2002 | Charrin .......... 235/492 |
| 2002/0152123 A1 | 10/2002 | Giordano et al. |
| 2002/0152124 A1 * | 10/2002 | Guzman et al. ............... 705/16 |
| 2002/0152168 A1 | 10/2002 | Neofytides et al. |
| 2002/0161705 A1 | 10/2002 | Khan et al. |
| 2002/0174016 A1 | 11/2002 | Cuervo |
| 2002/0174019 A1 | 11/2002 | Henderson et al. |
| 2003/0007615 A1 | 1/2003 | Parfait et al. |
| 2003/0015589 A1 | 1/2003 | Jimenez |
| 2003/0023549 A1 | 1/2003 | Armes et al. |
| 2003/0055780 A1 | 3/2003 | Hansen et al. |
| 2003/0055782 A1 | 3/2003 | Slater |
| 2003/0061157 A1 | 3/2003 | Hirka et al. |
| 2003/0066783 A1 | 4/2003 | Butler et al. |
| 2003/0088462 A1 | 5/2003 | Carrithers et al. |
| 2003/0101131 A1 | 5/2003 | Warren et al. |
| 2003/0111527 A1 * | 6/2003 | Blossom ............ 235/380 |
| 2003/0130940 A1 | 7/2003 | Hansen et al. |
| 2003/0135462 A1 | 7/2003 | Brake, Jr. et al. |
| 2003/0138343 A1 | 7/2003 | Matsui et al. |
| 2003/0144935 A1 * | 7/2003 | Sobek ............... 705/35 |
| 2003/0147664 A1 | 8/2003 | Suzuki et al. |
| 2003/0154163 A1 * | 8/2003 | Phillips et al. ............... 705/39 |
| 2003/0157925 A1 | 8/2003 | Sorber et al. |
| 2003/0158818 A1 | 8/2003 | George et al. |
| 2003/0195849 A1 | 10/2003 | Phillips et al. |
| 2003/0205616 A1 | 11/2003 | Graves et al. |
| 2003/0209608 A1 | 11/2003 | Blossom |
| 2003/0212796 A1 | 11/2003 | Willard |
| 2003/0222136 A1 | 12/2003 | Bolle et al. |
| 2003/0236704 A1 | 12/2003 | Antonucci |
| 2003/0236755 A1 | 12/2003 | Dagelet, Jr. |
| 2004/0006536 A1 * | 1/2004 | Kawashima et al. ........... 705/39 |
| 2004/0007618 A1 | 1/2004 | Oram et al. |
| 2004/0010449 A1 | 1/2004 | Berardi et al. |
| 2004/0024672 A1 | 2/2004 | Brake, Jr. et al. |
| 2004/0050928 A1 | 3/2004 | Bishop et al. |
| 2004/0064412 A1 | 4/2004 | Phillips et al. |
| 2004/0117300 A1 * | 6/2004 | Jones et al. ............... 705/39 |
| 2004/0133440 A1 | 7/2004 | Carolan et al. |
| 2004/0172362 A1 * | 9/2004 | Hausmann et al. ............. 705/41 |
| 2004/0186773 A1 | 9/2004 | George et al. |
| 2005/0027648 A1 * | 2/2005 | Knowles et al. ................ 705/38 |
| 2005/0055296 A1 * | 3/2005 | Hattersley et al. .............. 705/35 |
| 2005/0091116 A1 | 4/2005 | Monk |
| 2005/0114217 A1 | 5/2005 | Monk |
| 2006/0064379 A1 * | 3/2006 | Doran et al. ................ 705/42 |
| 2006/0161947 A1 * | 7/2006 | Laksono et al. ............... 725/34 |

FOREIGN PATENT DOCUMENTS

| | | |
|---|---|---|
| GB | 2 376 787 A | 12/2002 |
| GB | 2 377 071 A | 12/2002 |
| GB | 2 377 314 A | 1/2003 |
| JP | 04-070993 | 3/1992 |
| JP | 08-083309 | 3/1996 |
| JP | 11-259577 | 9/1999 |
| JP | 2001-236529 | 8/2001 |
| JP | 2002-373303 A | 12/2002 |
| JP | 2003-091670 A | 3/2003 |
| JP | 2003-115018 A | 4/2003 |
| JP | 2003-132283 A | 5/2003 |
| JP | 2003-151011 | 5/2003 |
| RU | 2150147 C1 | 5/2000 |
| WO | WO99/03057 | 1/1999 |
| WO | 0049551 A1 | 8/2000 |
| WO | 0154019 A1 | 7/2001 |
| WO | WO 02/47022 | 6/2002 |
| WO | 02102133 A2 | 12/2002 |
| WO | 03071389 A2 | 8/2003 |
| WO | 03088078 A2 | 10/2003 |
| WO | 2004093022 A1 | 10/2004 |
| WO | WO 2005/033997 | 4/2005 |

OTHER PUBLICATIONS

Press Release, "Starbucks Card Deals Customers a Winning Hand," Seattle, WA, Nov. 27, 2001.

Press Release, "A Versatile Holiday Gift—The Starbucks Card," 2002.

Press Release, "Starbucks Commitment to Jumpstart Helps Open Eight New Sites in Next Six Months," Seattle, WA, Mar. 27, 2002.

Press Release, "Starbucks Brings Customer Service to New Heights for Starbucks Card Users," Seattle, WA, Jul. 9, 2002.

Press Release, "Starbucks Launches New Automatic Reload Option for Starbucks Card," Seattle, WA, Sep. 17, 2002.

Starbucks Holiday Product Fact Sheet, Nov. 2002.

Press Release, "Starbucks Adds Personal Touch to the Starbucks Card," Seattle, WA, Dec. 12, 2002.

Press Release, "Starbucks Japan Launches Card Program using Valuelink's Program," Denver, CO, Jan. 22, 2003.

L. Scott Tillett, Merchants Grapple with Payment Options—Integration still a hurdle as credit-card alternative emerge, Internet Week, May 22, 2000, Issue 814, pp. 14.

Speedpass: How It Works, http://www.speedpass.com/how/index.jsp.

E-ZPass, Peace Bridge Authority Customer Service Center, https://www.pbaezpass.com/getez.
E-ZPass Online Application, https://ezpass.csc.paturnpike.com/paturnpike/default.asp.
Fast Lane FAQ, http:www.mtafastlane.com/content/faq/answers.html.

Visa International Launches Major Smart Card program in Leading Shopping and Entertainment District in Tokyo, PR Newswire, Jul. 15, 1998.

* cited by examiner

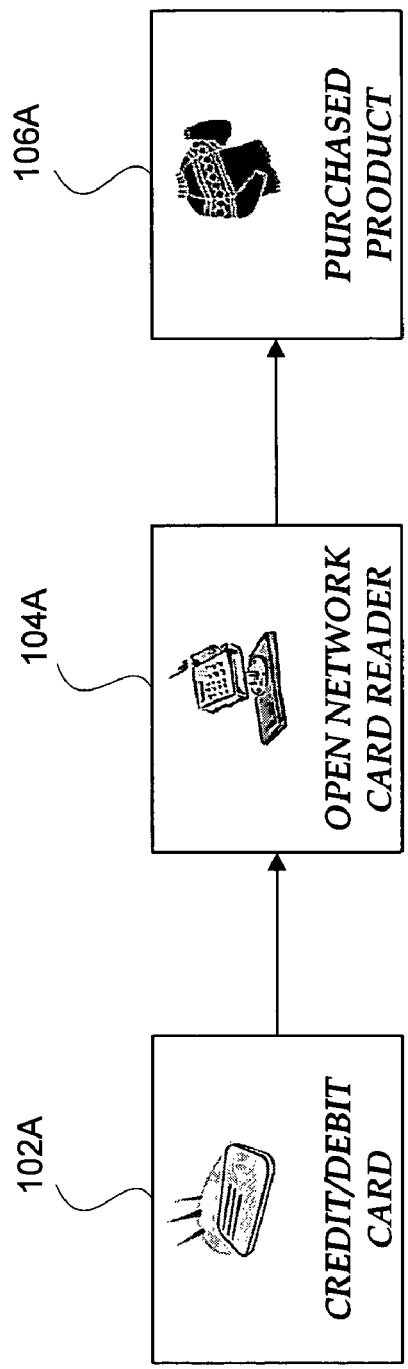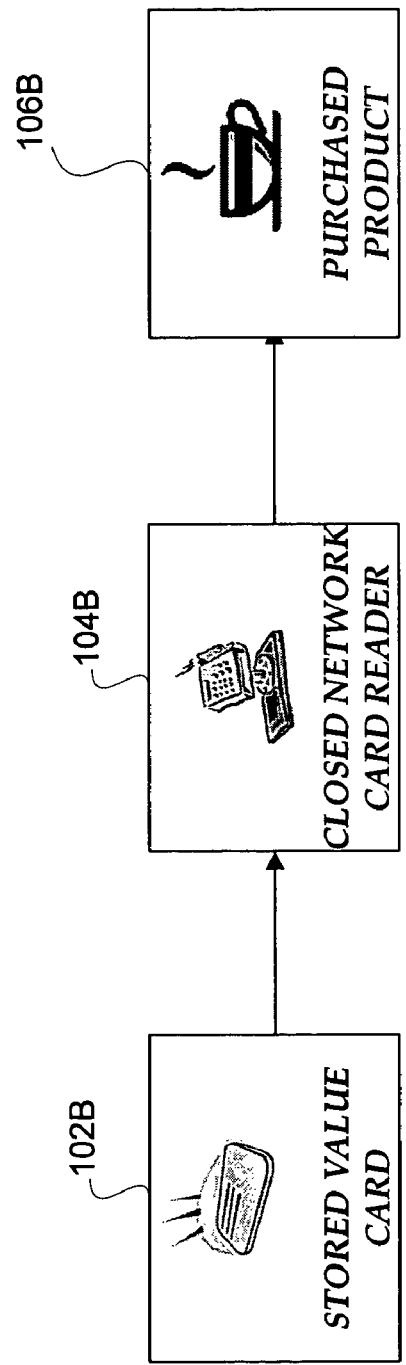
Fig.1A.
Fig.1B.

ns, which was started in Seattle, Wash., by a retailing executive) of the stored value card 102b (Starbucks card). The stored value card 102b is recognized by a closed network card reader 104b available in the stores or licensed stores of the sponsor business. When the stored value card 102b is recognized by the closed network card reader 104b, an amount for the purchased product 106b is decremented from a corresponding stored value account associated with the stored value card 102b.

DUAL CARD

CROSS-REFERENCES TO RELATED APPLICATIONS

This application is a continuation of International Application No. PCT/IB03/04512, designating the United States, filed Oct. 13, 2003. This application further claims the benefit of U.S. Provisional Application No. 60/511,068, filed Oct. 14, 2003.

FIELD OF THE INVENTION

The present invention relates generally to payment cards, and more particularly, to payment cards that can be used for both on an open network and a closed network.

BACKGROUND OF THE INVENTION

A payment card is a flat, stiff, usually small, and rectangular piece of plastic material bearing financial information that can be processed to pay for goods or services. In the 1960s, charge cards allowed cardholders to charge obtained goods or services to charge accounts, accumulating balances to be paid in full by the end of the month. In the 1970s, a bank executive in Seattle, Wash., created a reliable system of payment cards that provides credit privileges to cardholders so that account balances need not be paid in full each month, but in increments over time with interest. These credit cards are now known as Visa cards. In the 1980s, MasterCard, a major competitor to Visa, developed debit cards, which are payment cards that allow purchases to be paid with money withdrawn directly from cardholders' bank accounts without the payment of interest associated with credit cards. In the 1990s, a combination credit/debit card 102a was developed.

To purchase goods or services, such as a purchased product 106a (e.g., a sweater), a cardholder presents the credit/debit card 102a to a clerk who swipes the credit/debit card 102a through an open network card reader 104a. See FIG. 1A. The financial information obtained from the swiping process causes a charge to appear on either a credit account or a bank account to pay for the purchased product 106a. Given the pervasiveness of charge cards, credit cards, debit cards, and credit/debit cards (over one billion issued), the financial transaction interchange to which charge cards, credit cards, debit cards, and credit/debit cards belong can be considered an open network.

Charge cards, credit cards, debit cards, and credit/debit cards are issued by banks. These payment cards are typically embellished with the brand name of the issuing bank. Banks, like other businesses, rely on advertising to publicly promote the sale of specific goods or services. A brand name affixed to a payment card is a form of advertising called institutional advertising, which is designed to build prestige and public respect for a particular business concern (and form in the minds of the consuming public that such a business is an important institution). This type of commercial persuasion mentions products or services for sale by the institution only incidentally because the focus is on the institution itself. When people use charge cards, credit cards, debit cards, or credit/debit cards, the resulting goodwill with which they form in their minds is closely connected to the banks that issued these payment cards instead of to the businesses that actually provide the goods or services.

FIG. 1B illustrates an entirely different payment card that is generally not issued by a bank, but by a business that sponsors a payment card called a stored value card 102b. The sponsor business can adorn its own brand name on the stored value card 102b to create its own institutional advertising so as to build prestige and public respect for the sponsor business. Unlike other payment cards, the stored value card 102b is a card that allows payments to be withdrawn for the cost of purchases from a cardholder's stored value account which the cardholder has pre-loaded with a certain amount of money. Unlike a debit card, no cash can be withdrawn from the stored value account. The stored value card 102b can be used to procure products or services, such as a purchased product 106b (e.g. coffee), offered by the sponsor (e.g., Starbucks Corporatio Although operating in a closed network, certain stored value cards become so widely adopted by consumers that it would be convenient for the consumers if the stored value card 102b were to be accepted on the open network presently accessible by charge cards, credit cards, debit cards, and credit/debit cards. The problem is that the open network is maintained by banks whereas the closed network is maintained by the sponsor business of the stored value account. Stored value cards are not recognized by the open network card reader 104a because they are not issued by banks and because the stored value accounts corresponding to these stored value cards are not maintained by banks. Thus, there is a need for a payment card, system, and method for paying for goods or services on both an open network associated with a credit card account and a closed network associated with a stored value account while avoiding or reducing the foregoing and other problems associated with existing systems.

SUMMARY OF THE INVENTION

In accordance with this invention, a system, method, and computer-readable medium for making payment transactions is provided. The system form of the invention includes a networked system in which payment transactions flow. The networked system comprises an open network for communicating credit transactions. The networked system further comprises a closed network for communicating stored value transactions. The networked system yet further comprises a dual card on which information is stored for facilitating credit transactions over the open network and stored value transactions over the closed network. The networked system as yet further comprises a third party store in which the dual card is used to pay for goods or services. The third party store is capable of transmitting credit transactions over the open network. The networked system also comprises a sponsor store of a sponsor business associated with the dual card. The sponsor store is capable of accepting the dual card as payment for goods or services. The sponsor store is capable of transmitting stored value transactions over the closed network. The networked system yet also comprises a credit card processor coupled to the open network for processing credit transactions. The networked system further as yet also comprises a stored value processor coupled to the closed network for processing stored value transactions. The networked system includes a dual card support center coupled to the closed network and the stored value processor. The dual card support center is capable of routing stored value transactions received from the closed network to the stored value processor.

Another system form of the invention includes a networked system in which payment transactions flow. The networked system comprises a closed network for communicating credit and stored value transactions. The networked system further comprises a dual card on which information is stored for facilitating credit transactions over the closed network and stored value transactions over the closed network. The networked system yet further comprises a point-of-sale machine, which is capable of extracting information from the dual card to send a credit transaction or a stored value transaction over the closed network. The networked system as yet further comprises a credit card processor for processing credit transactions. The networked system also comprises a stored value processor for processing stored value transactions. The networked system yet also comprises a transaction router to route credit transactions to the credit card processor and stored value transactions to the stored value processor.

A computer-readable form of the invention includes a computer-readable medium having information stored thereon for a set of computer-implemented instructions to perform a method for communicating payment transactions. The computer-readable medium comprises credit information for facilitating credit transactions over an open network to pay for goods or services. The computer-readable medium further comprises stored value information for facilitating stored value transactions a closed network to pay for goods or services.

A method form of the invention includes a method for creating a dual card account. The method comprises receiving a credit data file from a credit card issuing bank. The credit data file is indicating that credit privileges are available to a holder of the dual card. The method further comprises generating a stored value confirmation file to be sent a stored value processor. The stored value data file is indicating that stored value privileges are available to the cardholder. The method yet further comprises issuing the dual card to the cardholder. The method as yet further comprises loading a stored value account associated with the dual card with an initial amount of value. The method also comprises receiving activation instructions by the cardholder to activate the dual card for use. The method yet also comprises receiving a stream of revenue from the credit card issuing bank for the dual card issued to the cardholder. The stream of revenue includes a monetary amount for a first credit transaction incurred by the cardholder. The stream of revenue includes a monetary amount for an anniversary renewal of the dual card with the credit card issuing bank.

Another method form of the invention includes a method for merging dual cards. The method comprises receiving multiple dual card numbers to be merged on a Web page. The method further comprises merging stored value accounts of multiple dual cards into one dual card stored value account. The method yet further comprises submitting by a dual card support center the received multiple dual card numbers to a stored value processor. The method as yet further comprises receiving balances of stored value accounts of multiple dual cards associated with multiple dual card numbers. The method also comprises instructing the stored value processor to merge stored value accounts into one stored value account.

Another method form of the invention includes a method for making payment transactions using a dual card. The method comprises receiving information from a payment card to pay for goods or services. The method further comprises recognizing the payment card as the dual card based on its identification number. The method yet further comprises prompting to confirm whether a credit or stored value transaction is desired. The method as yet further comprises receiving a selection of a credit transaction, which is forwarded to a credit card processor where the credit transaction is processed. The method also comprises receiving a selection of a stored value transaction, which is forwarded to a stored value processor where the stored value transaction is processed. The method yet also comprises prompting for additional payment if there is insufficient credit in a credit card account or value in a stored value account. The method as yet also comprises prompting for a reload transaction to replenish a stored value account if the stored value account is under a threshold.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a block diagram illustrating a system for paying for goods or services using a conventional credit/debit card;

FIG. 1B is a block diagram illustrating a system for paying for goods or services using a conventional stored value card;

DETAILED DESCRIPTION OF THE PREFERRED EMBODIMENT

Figure 2A:
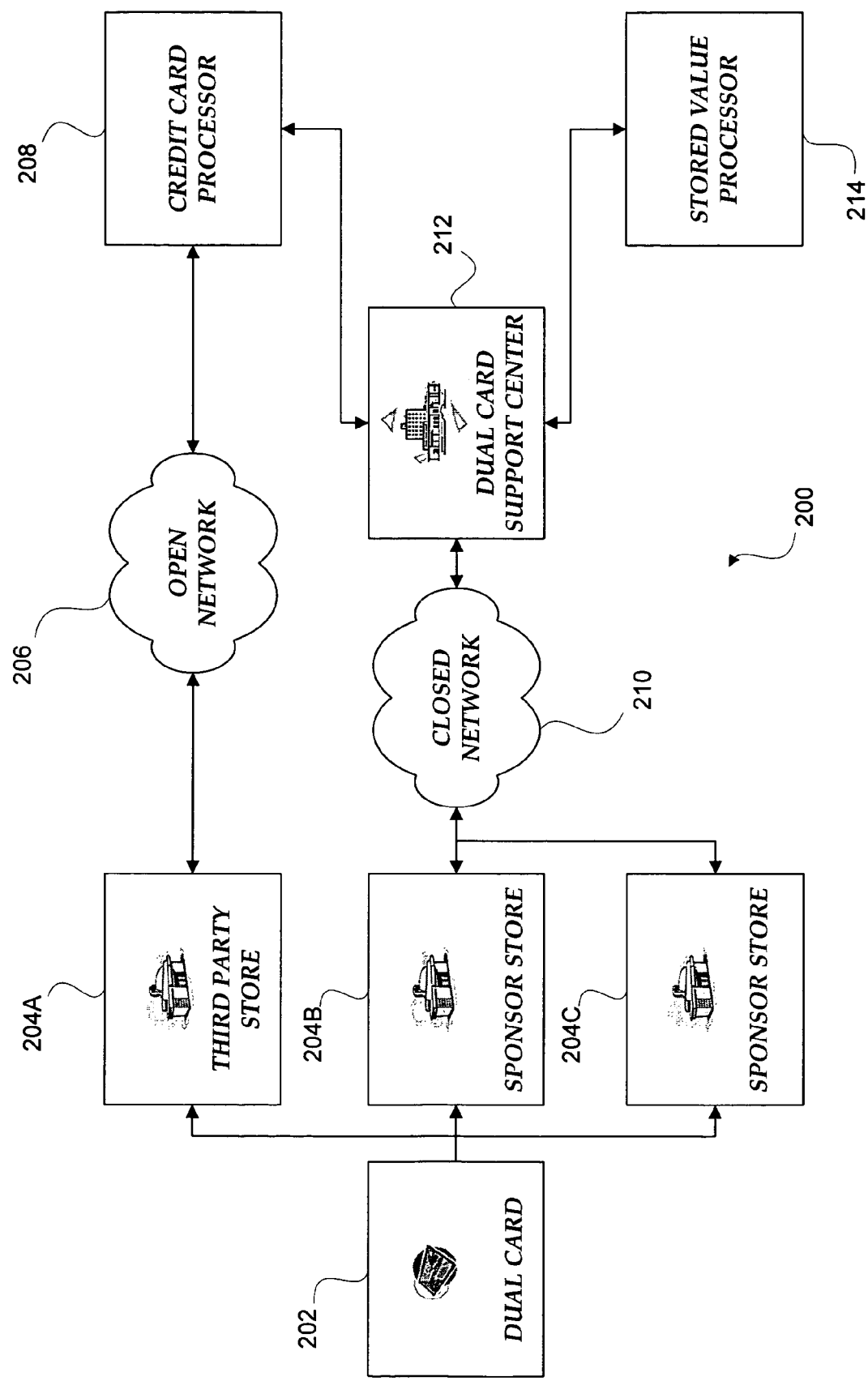
FIG. 2A is a block diagram illustrating an exemplary system for processing a dual card that operates on both an open network and a closed network, according to one embodiment of the present invention.

A dual card 202, which facilitates payment for goods or services from either a credit account or a stored value account, is illustrated at FIG. 2A. The dual card 202 is a payment card that integrates the ability to provide credit privileges and stored value privileges to a cardholder of the dual card 202. The features, benefits, and advantages of a stored value card are integrated with the credit card aspects of the dual card 202. The benefits, features, and advantages of a credit card are integrated with a stored value card. The dual card 202 is sponsored by a sponsor business, which can emboss the dual card 202 with its brand name and earn favor and prestige from the cardholder beyond the mere value of what the sponsor business sells. The dual card 202, unlike a credit card or a stored value card, can be used on both an open network 206 and a closed network 210 in a system 200. When used on the open network 206, the dual card 202 can be accepted anywhere in the world where a credit card is accepted as payment for goods or services.

When the dual card 202 is used in the third-party store 204a, credit privileges are extended to the cardholder of the dual card 202. Credit payment transactions are communicated from the third-party store 204a to a credit card processor via the open network 206, which is a system of computers, terminals, and databases connected by communication lines to reliably exchange credit payment information. The third-party store 204a is a retail business establishment that sells goods or provides services directly to consumers. The third-party store 204a is neither associated with the sponsor business nor licensed by the sponsor business to use the dual card 202.

The sponsor business has a number of sponsor stores 204b-204c, which are business establishments where goods of a particular theme are kept for retail sale or services of a similar theme are provided to consumers. When the dual card 202 is used at sponsor stores 204b-204c, both credit privileges and stored value privileges are extended to the cardholder of the dual card 202. In other words, the cardholder of the dual 202 can use the dual card 202 as a credit card or as a stored value card in the sponsor stores 204b-204c. Sponsor stores 204b-204c not only include business establishments of the sponsor business in which the dual card 202 is accepted, but also other business establishments that are licensed to sell goods or provide services created by the sponsor business.

Payment transactions generated from the use of the dual card 202 in the sponsor stores 204b-204c are communicated to a dual card support center 212 via the closed network 210. The closed network 210 consists of many small and large computers distributed over a vast geographic area (WAN or wide area network). One exemplary implementation of a WAN is the Internet, which is a worldwide collection of networks and gateways that use the TCP/IP suite of protocols to communicate with one another. At the heart of the Internet is a backbone of high-speed data communication lines between major nodes or host computers, including thousands of commercial, government, educational, and other computer systems that route data and messages.

The dual card support center 212 is preferably maintained by the sponsor business to house a number of computers to provide support services, such as access to account files associated with cardholders of dual cards or routing of payment transactions to the credit card processor 208 or to a stored value processor 214. Whereas the credit card processor 208 processes credit payment transactions connected with the credit account of the dual card 202, the stored value processor 214 processes stored value payment transactions connected with the stored value account of the dual card 202.

Point-of-sale machines, located at sponsor stores 204b-204c, can detect whether a credit payment transaction or a stored value payment transaction is desired by a customer. If a payment transaction is a credit payment transaction, the credit payment transaction will be transmitted from a point-of-sale machine located in one of the sponsor stores 204b-204c to the dual card support center 212 via the closed network 210. The dual card support center 212 communicates with the credit card processor 208 to obtain authorization for the credit payment transaction. Approval or rejection of the credit payment transaction is communicated from the credit card processor 208 to the dual card support center 212. The dual card support center 212 communicates the approval or rejection of the credit payment transaction to the point-of-sale machine at the sponsor stores 204b-204c from which the credit payment transaction originated. Settlement of credit payment transactions is preferably done at the end of a business day to credit or debit/credit accounts of cardholders of dual cards and the sponsor business.

If a payment transaction is a stored value payment transaction, the stored value payment transaction is transmitted from a point-of-sale machine located in one of the sponsor stores 204b-204c to the dual card support center 212 via the closed network 210. The dual card support center 212 communicates with the stored value processor 214 to obtain authorization for the stored value payment transaction. Approval or rejection of the stored value payment transaction is communicated from the stored value processor 214 to the dual card support center 212. The dual card support center 212 communicates the approval or rejection of the stored value payment transaction to the point-of-sale machine at the sponsor stores 204b-204c from which the stored value payment transaction originated.

Figure 2B:
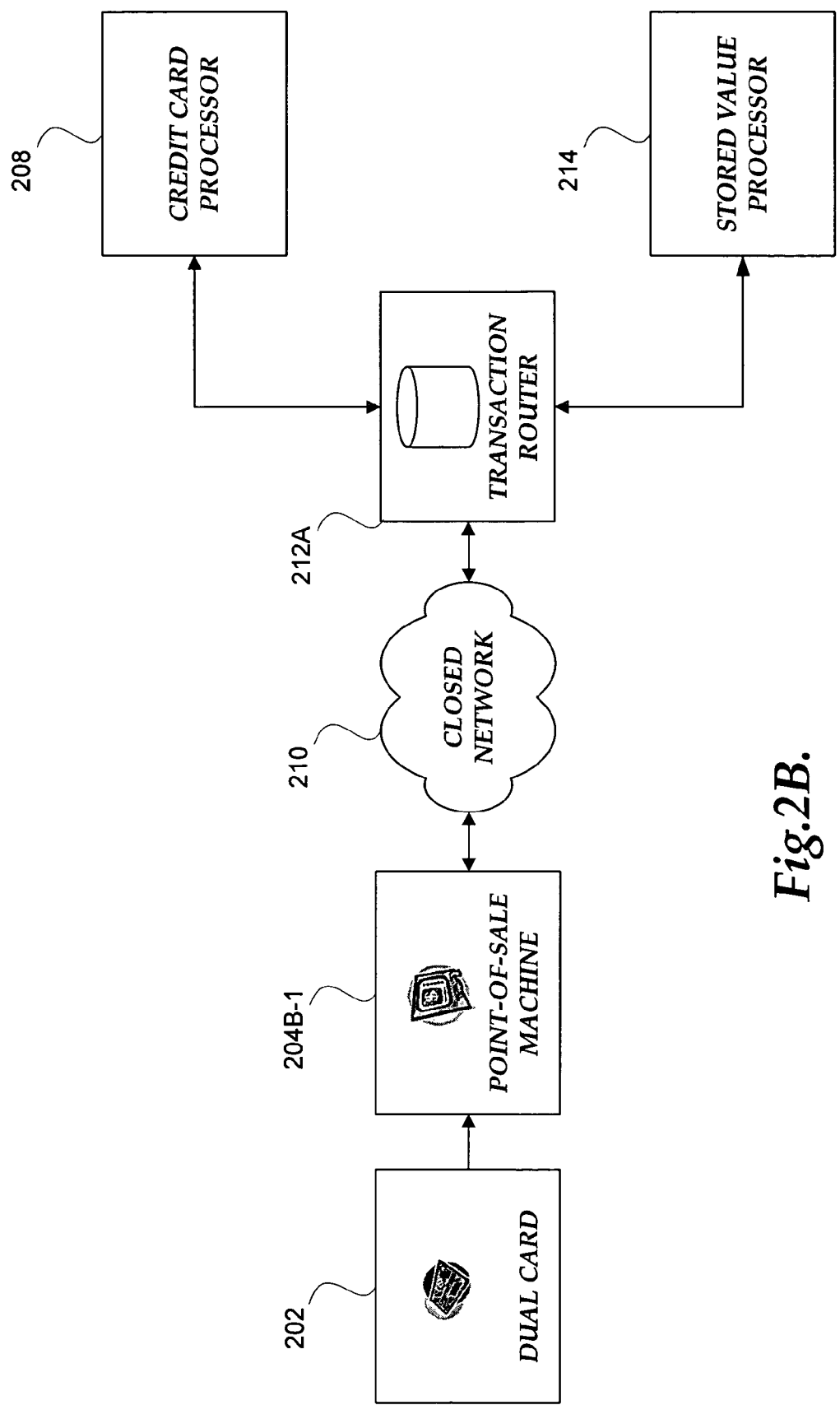
FIG. 2B is a block diagram illustrating pieces of a system for processing a dual card as both a credit card and a stored value card through a closed network, according to one embodiment of the present invention.

FIG. 2B illustrates in greater detail the use of the dual card 202 at a point-of-sale machine 204b-1 located in the sponsor store 204b. Payment transactions are transmitted from the point-of-sale machine 204b-1 through the closed network 210 to a transaction router 212a located at the dual card support center 212. The transaction router 212a comprises one or more intermediary devices on the closed network that expedites delivery of credit payment transactions and stored value payment transactions. On a single network linking many point-of-sale machines through a mesh of possible connections, the transaction router 212a receives transmitted payment transactions and forwards them to their correct destinations. Depending on whether a payment transaction is a credit payment transaction or a stored value payment transaction, the transaction router 212 routes the payment transaction to the credit card processor 208 or to the stored value processor 214.

Prior to making a payment transaction, the cardholder informs a clerk at the sponsor store 204b that the dual card 202 is to be used for a credit payment transaction or a stored value payment transaction. The clerk actuates buttons on the point-of-sale machine 204-1 to indicate the type of payment transaction desired and swipes the dual card 202 through the point-of-sale machine 204b-1. The payment transaction is communicated from the point-of-sale machine 204b-1 as discussed above. The point-of-sale machine 204b-1 can also be used to replenish the stored value account of the dual card 202 with a credit card account, such as with the credit aspect of the dual card 202; or cash tendered by the cardholder of the dual card 202.

With a change in software, the point-of-sale machine 204b-1 can be programmed to recognize that a payment card is a dual card based on the identification of the dual card. For example, if the identification number of the dual card is within a certain numerical range, the point-of-sale 204b-1 concludes whether the payment card is a dual card. When the point-of-sale machine 204b-1 recognizes that the dual card 202 is being used for payment transactions, one of two payment transactions can occur, credit or stored value. This information can be used to prompt a clerk to request from the cardholder of the dual card 202 the desired payment transaction or information to facilitate a particular payment transaction. The numerical range of the dual card 202 allows the point-of-sale machine 204b-1 to distinguish the dual card 202 from a credit card or other stored value cards. Preferably, the identification number of the dual card 202 is stored on the second track of a magnetic strip on the back of the dual card 202.

Figure 2C:
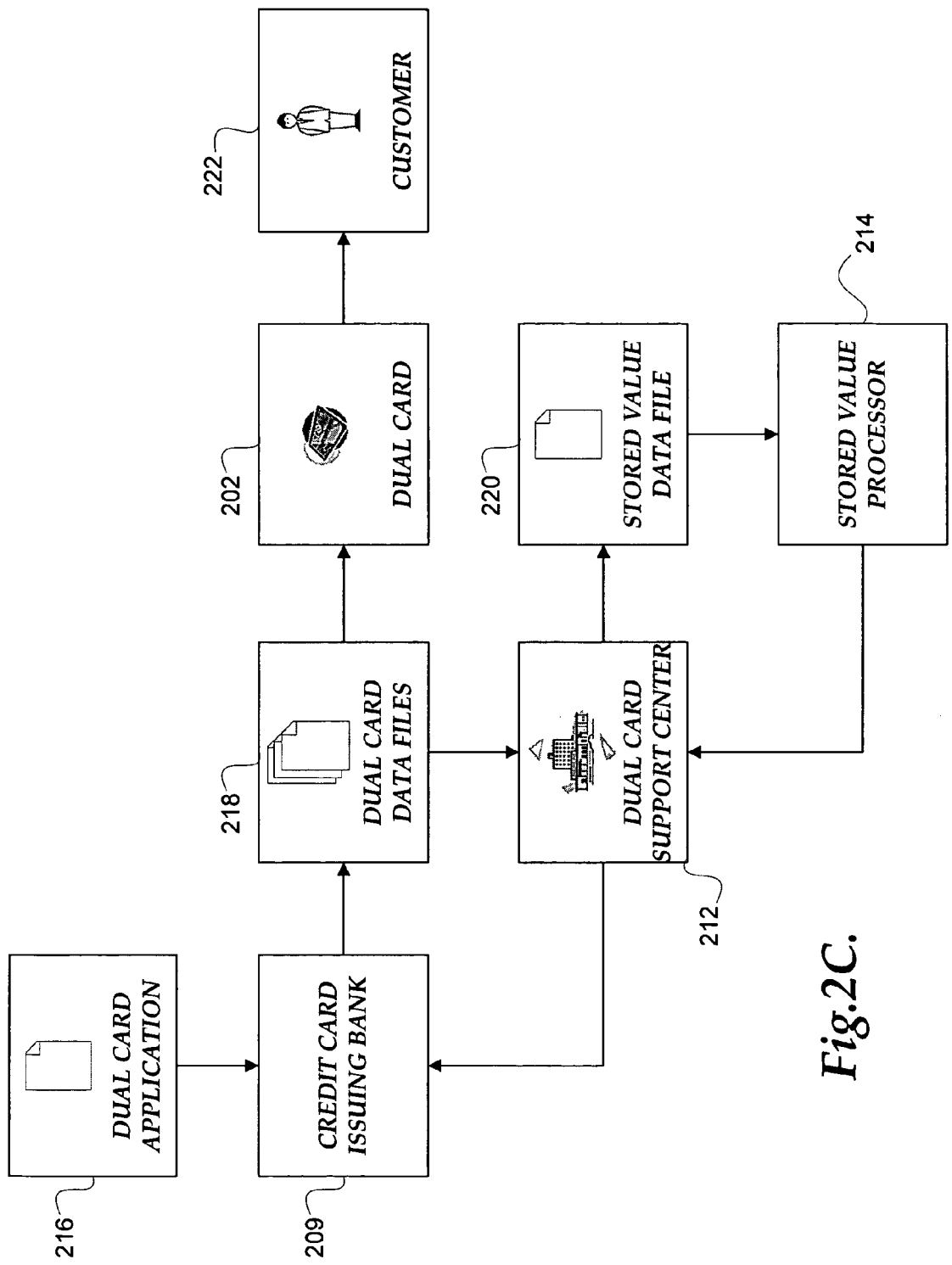
FIG. 2C is a block diagram illustrating pieces of a system for creating a dual card, according to one embodiment of the present invention.

The creation of the dual card 202 is illustrated at FIG. 2C. A customer 222 can apply for the dual card 202 by filling out a dual card application 216 online at a Web site associated with the sponsor business or by filling out a printed application. The dual card application 216 can also be filled out by a customer service representative of the sponsor business when the customer 222 calls over the telephone and wishes to apply for the dual card 202. After the dual card application 216 is filled out, it is transmitted or sent to a credit card issuing bank 209. Unlike a credit card where the credit card issuing bank 209 affixes its own brand name, the dual card 202 is affixed with a brand name of the sponsor business. On the dual card application 216, the customer 222 can indicate an initial amount to be loaded on the stored value account associated with the dual card 202. If an initial load amount is specified by the customer 222, the specified amount is placed on the stored value account when the dual card 202 is activated by the customer 222.

After the credit card issuing bank 209 receives the dual card application 216, the credit card issuing bank 209 processes the dual card application 216 and determines whether the customer 222 is credit worthy to obtain the credit privileges associated with the dual card 202. If the credit worthiness of customer 222 justifies the extension of credit privileges, the credit card issuing bank 209 produces a new account file among dual card data files 218 indicating that a new account connected with the customer 222 has been created. Preferably, the new account file among the dual account files 218 includes the name, address, and account number of the customer 222. A vendor produces the dual card 202, as a flat, stiff, usually small, and rectangular piece of plastic material, which is embossed with the brand name of the sponsor business. The dual card 202 is then sent to the customer 222.

Preferably at the end of the business day, the dual card support center 212 pulls the new account file from among the dual card data files 218 and updates a database at the dual card support center 212 to reflect the new dual card account that has been approved by the credit card issuing bank 209. For an approved account, the dual card support center 212 produces a stored value data file 220, which includes a new account number associated with the dual card 202; a transaction type (e.g., activation of the new account, maintenance of the account, or closure of the account); and an initial load amount previously specified by the customer 222. After processing the stored value data file 220, the stored value processor 214 notifies the dual card support center 212 that a stored value account associated with the dual card 202 is active. In turn, the dual card support center 212 notifies the credit card issuing bank 209 that the dual card 202 is active and can be activated by the customer 222.

When the customer 222, the credit card issuing bank 209, or the sponsor business decides to close the account associated with the dual card 202, the credit card issuing bank 209 produces a closed account file among the dual card data files 218. The dual card support center 212 processes the closed account file and notifies the stored value processor 214. The stored value processor 214 freezes the stored value account connected with the dual card 202 and communicates a remaining amount to the dual card support center 212, which issues a stored value card to the customer 222.

When the customer 222 uses the dual card 202 for the first time in a credit payment transaction for procured goods or services, the credit card issuing bank 209 preferably issues a bounty, reward, premium, subsidy, or grant to encourage the sponsor business to promote the adoption of dual cards by additional customers. Additionally, a bounty, reward, premium, subsidy, or grant of a certain amount of money is preferably paid to the sponsor business by the credit card issuing bank 209 at a renewal anniversary of the dual card 202 by the customer 222. These amounts of money constitute a stream of revenue for the sponsor business along with the favor or prestige that the sponsor business has earned by the customer's use of the dual card beyond the mere value of what it sells or provides.

Figure 3A:
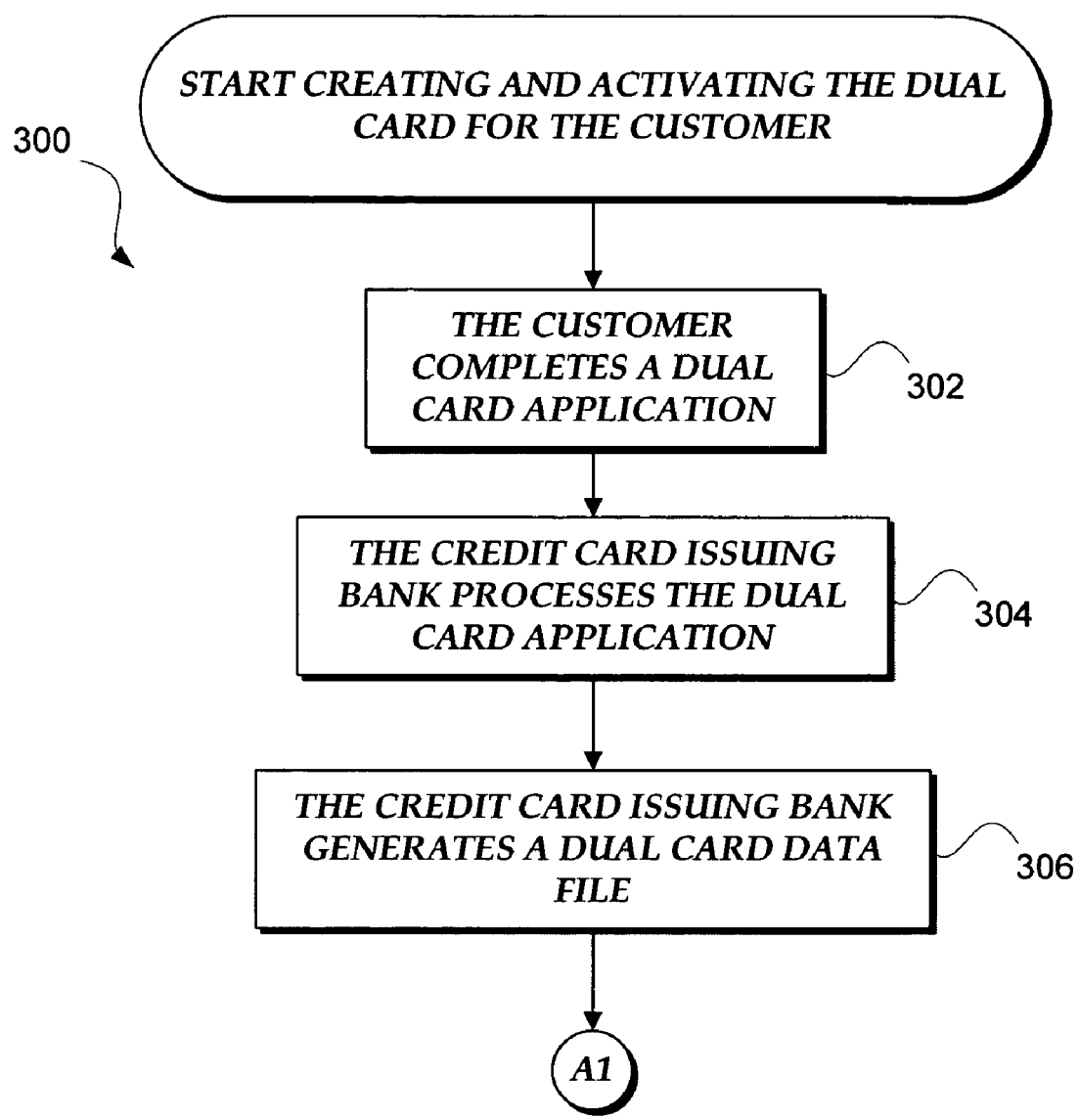
FIGS. 3A-3C are process diagrams illustrating a method for creating and activating a dual card for a customer, according to one embodiment of the present invention.
Figure 3B:
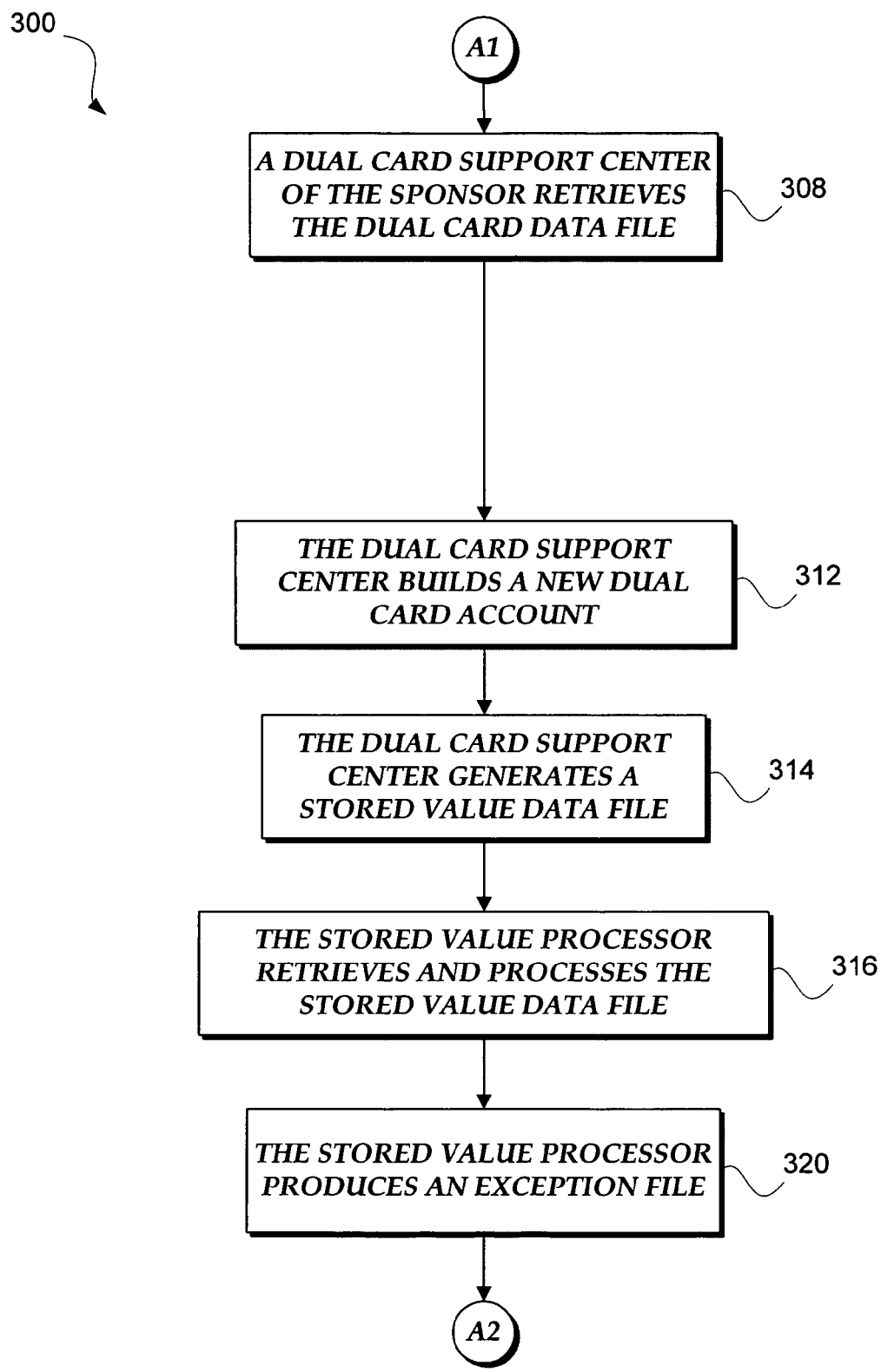
Figure 3C:
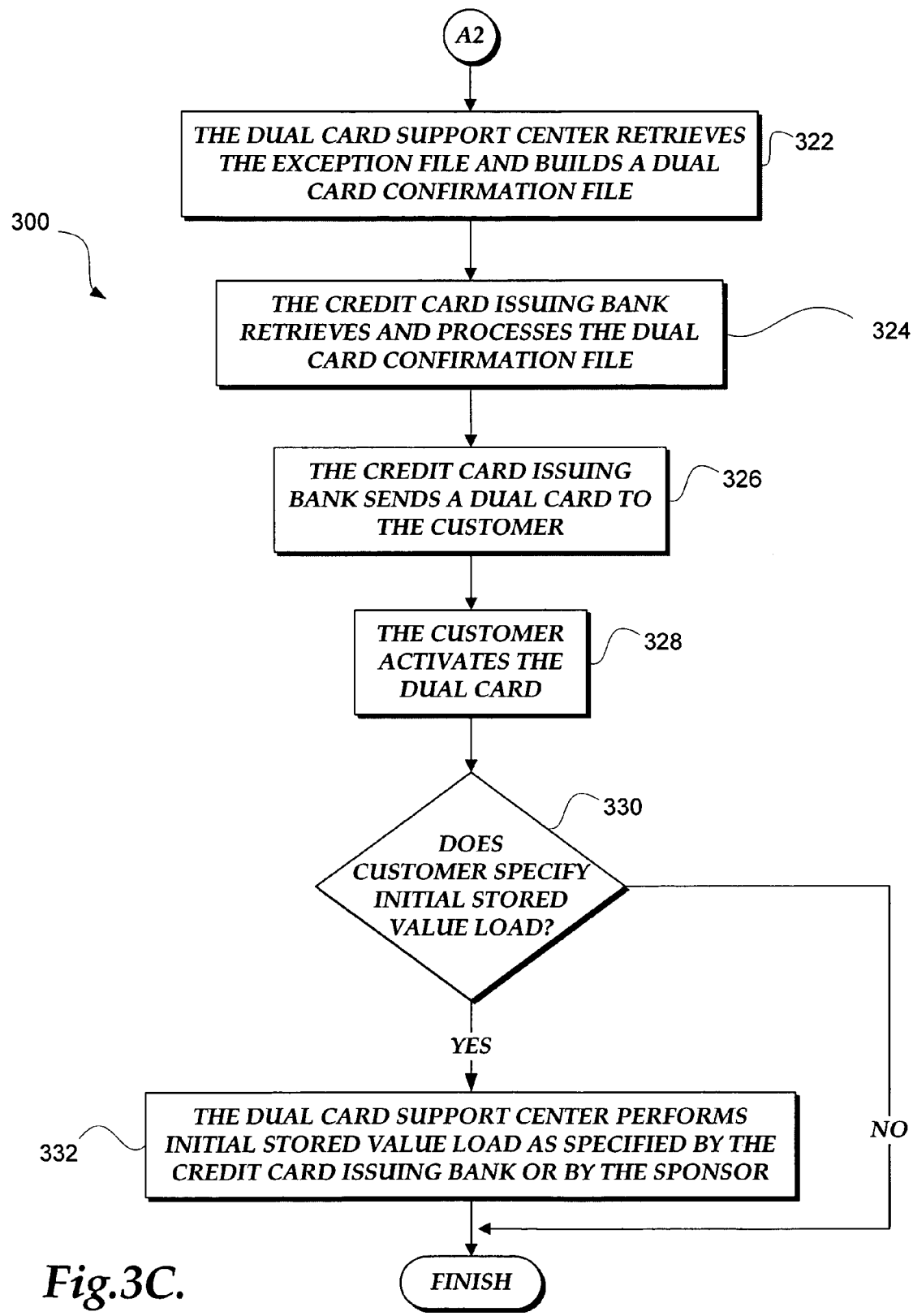
Figure 4A:
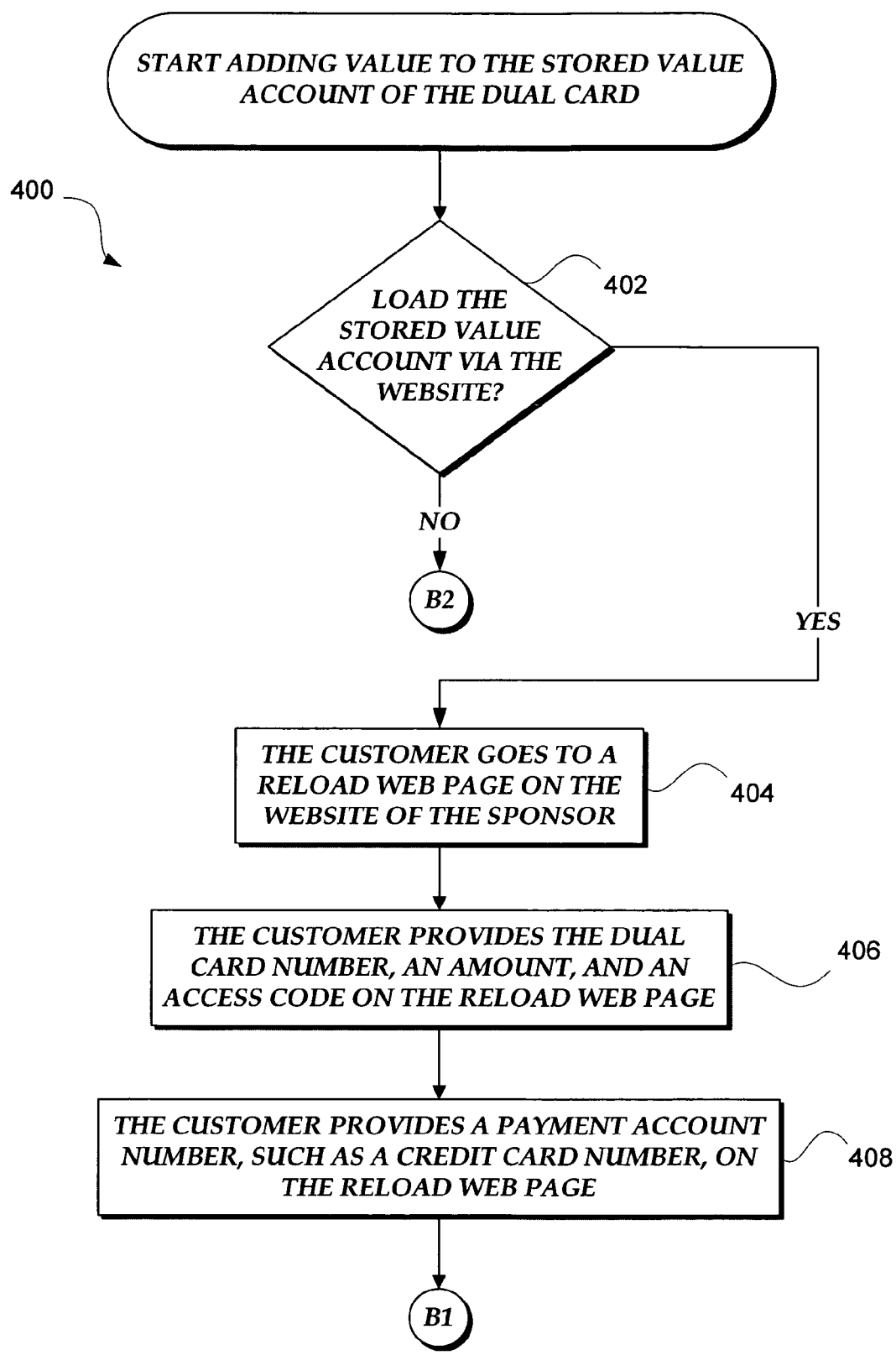
FIGS. 4A-4D are process diagrams illustrating a method for adding value to the stored value account of a dual card, according to one embodiment of the present invention.
Figure 4B:
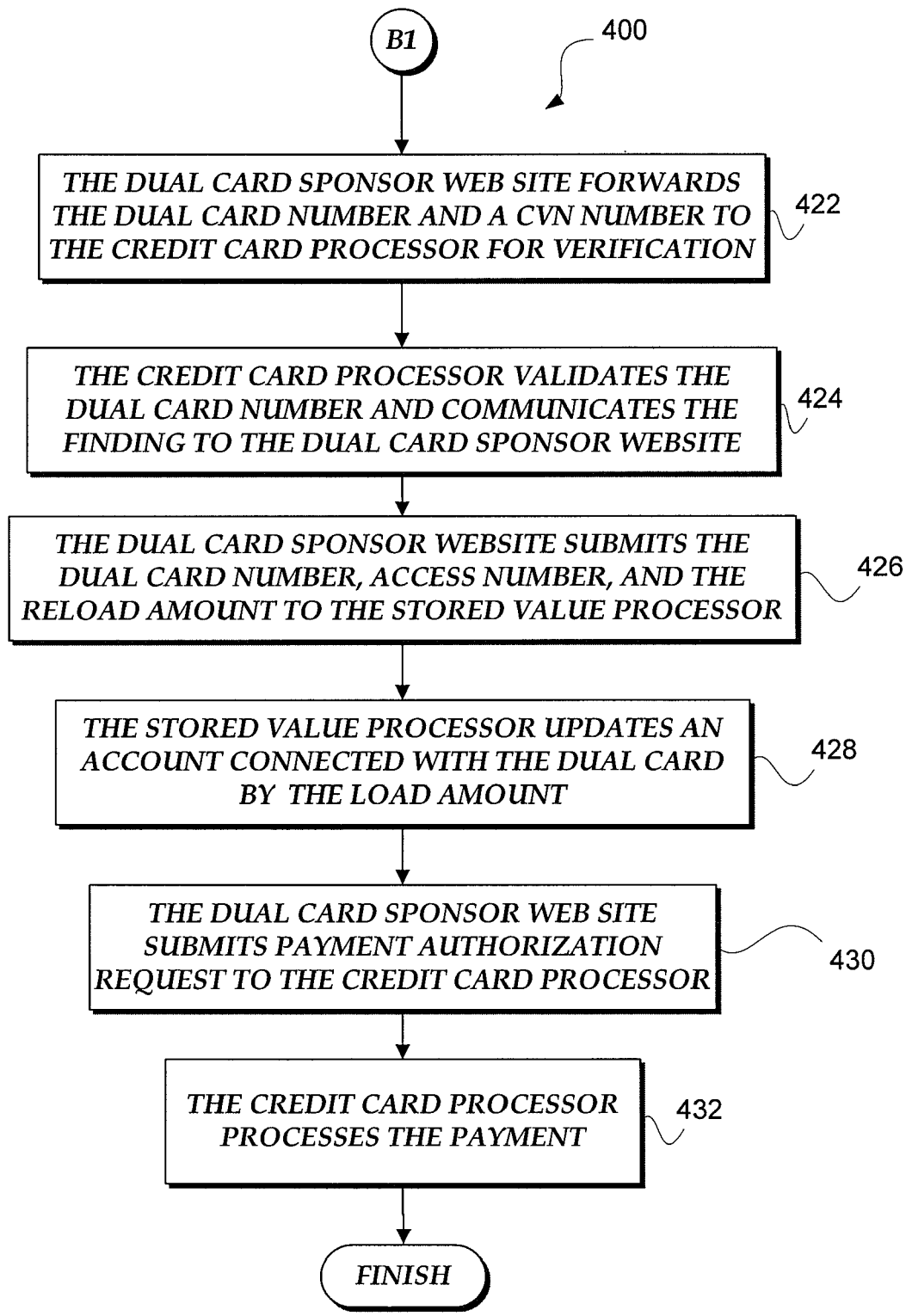
Figure 4C:
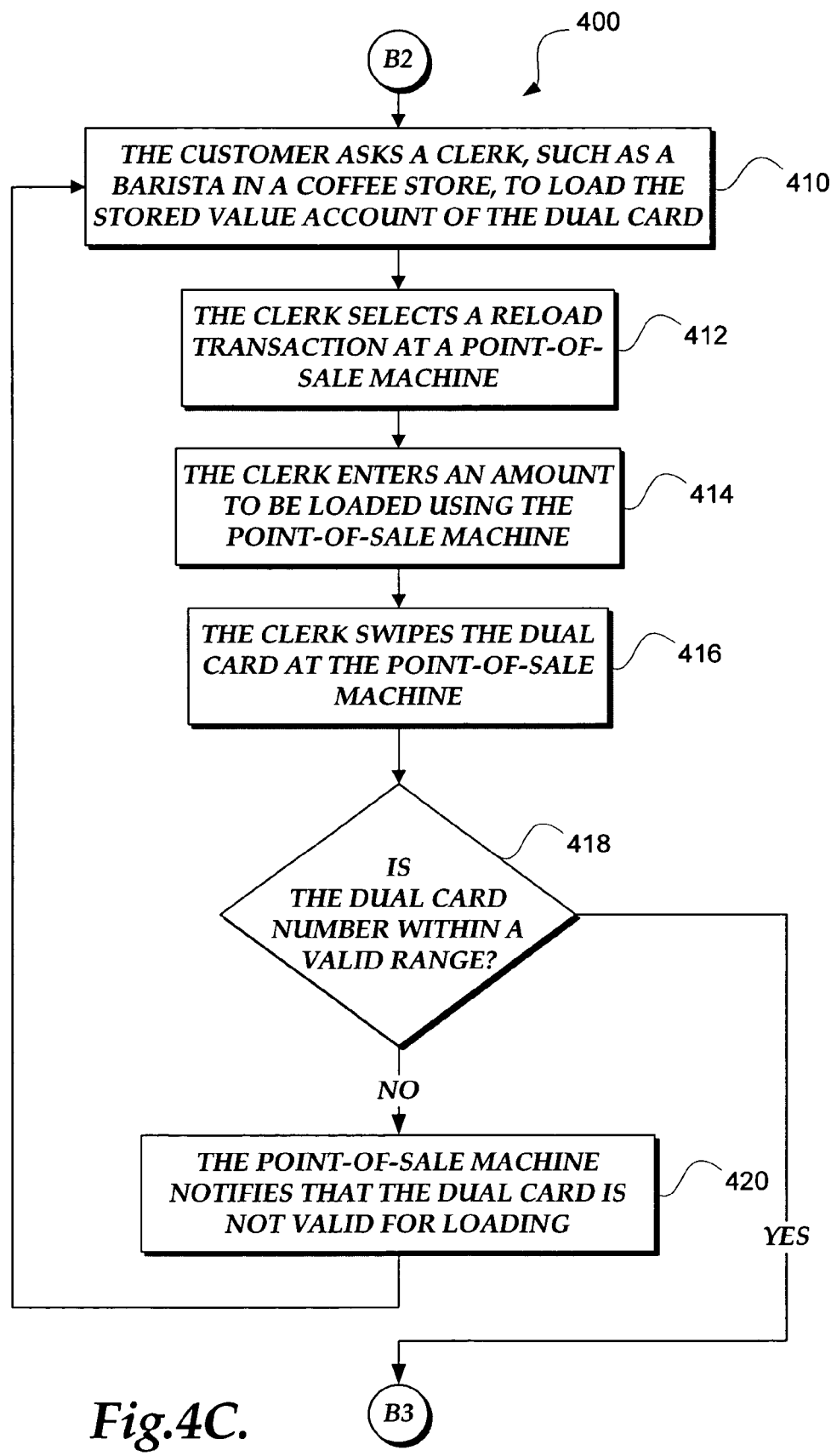
Figure 4D:
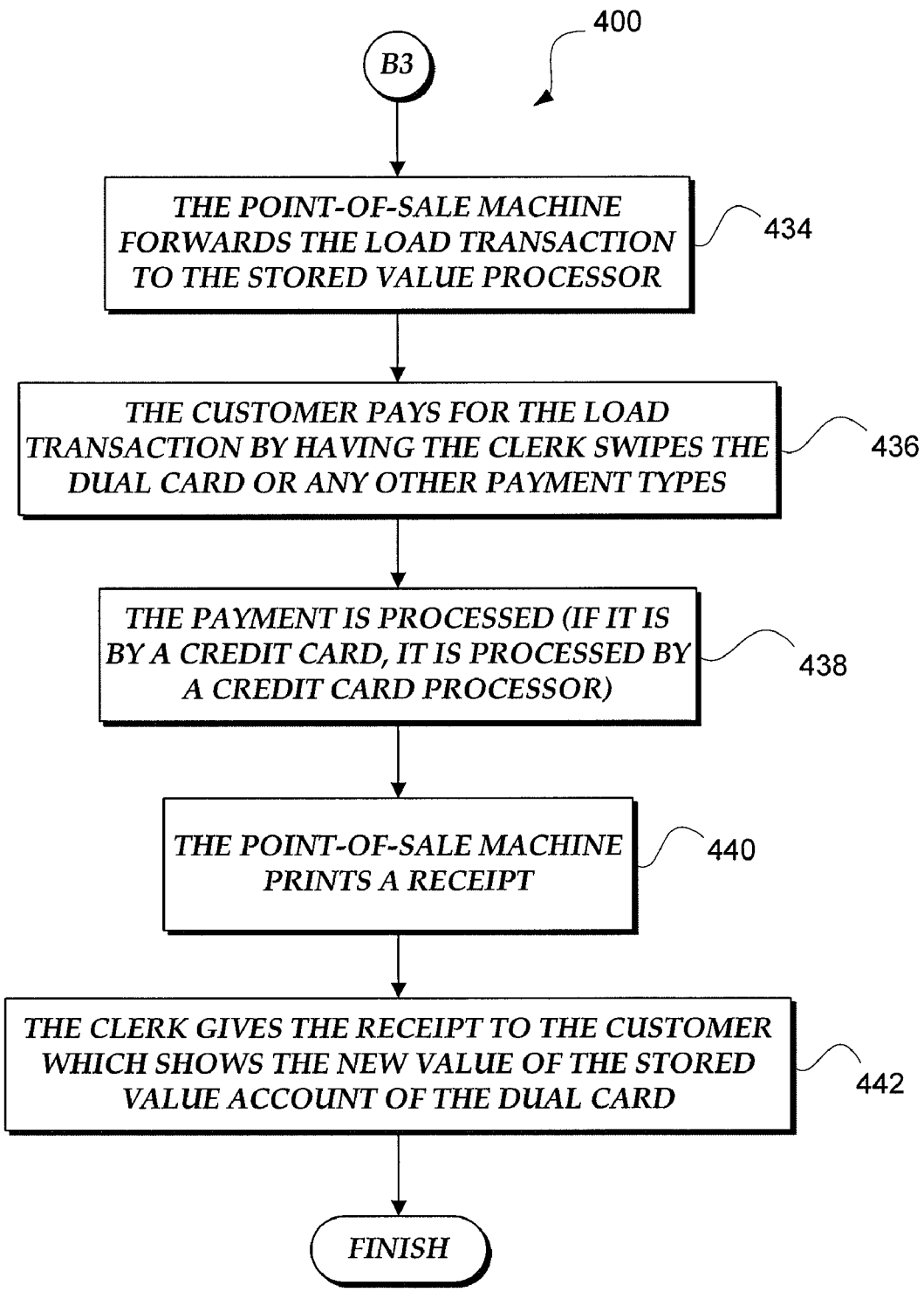

FIGS. 3A-3C illustrate a method 300 for creating and activating the dual card 202 for the customer 222. From a start block (FIG. 3A), the method 300 proceeds to block 302 where the customer 322 completes the dual card application 216. When the dual card application 216 is sent to the credit card issuing bank 209, the credit card issuing bank 209 processes the dual card application 216. See block 304. At block 306, the credit card issuing bank 209 generates a dual card data file. The method then proceeds to another continuation terminal ("terminal A1").

From terminal A1 (FIG. 3B), the method 300 proceeds to block 308 where the dual card support center 212 of the sponsor business retrieves the dual card data file. The method 300 proceeds to block 312 where the dual card support center 212 builds a new dual card account. The dual card support center 212 generates a stored value data file 220. See block 314. At block 316, the stored value processor 214 retrieves and processes the stored value data file 220. The method 300 proceeds to block 320 where the stored value processor 214 produces an exception file. The method 300 then enters another continuation terminal ("terminal A2").

From terminal A2 (FIG. 3C), the method 300 proceeds to block 322 where the dual card support center 212 retrieves the exception file and builds a dual card confirmation file. The credit card issuing bank 209 retrieves and processes the dual card confirmation file. See block 324. At block 326, the credit card issuing bank 209 sends the dual card 202 to the customer 222. The method 300 proceeds to block 328, where the customer 222 activates the dual card 202 by calling a phone number printed on a removable adhesive label affixed to the dual card 202. A decision block 330 is entered by the method 300 where a test is made to determine whether the customer 222 specifies an initial stored value load to the stored value account connected with the dual card 202. If the answer to the test at decision block 330 is NO, the method 300 terminates execution. Otherwise, the answer to the test at decision block 330 is YES, and at block 332, the dual card support center 212 performs an initial stored value load with an amount of money as specified by the credit card issuing bank 209 or by the sponsor business of the dual card 202.

FIGS. 4A-4D illustrate a method 400 for adding value to the stored value account of the dual card 202. From a start block (FIG. 4A), the method 400 proceeds to decision block 402 where a test is made to determine whether to load the stored value account via a Web site associated with the sponsor business. If the answer to the test at decision block 402 is NO, the method 400 proceeds to another continuation terminal ("terminal B2").

If the answer to the test at decision block 402 is YES, the method 400 proceeds to block 404 where the customer 222 goes to a reload on a Web page on the Web site of the sponsor business. The customer 222 provides the dual card number, an amount to be loaded, and an access code on the reload Web page. See block 406. At block 408, the customer 222 provides a payment account number, such as a credit card number, on the reload Web page. The method 400 then enters another continuation terminal ("terminal B1").

From terminal B1 (FIG. 4B), the method 400 proceeds to block 422 where the dual card sponsor Web site forwards the dual card number and a CVN ("card verification number") number to the credit card processor 208 for verification. The credit card processor 208 validates the dual card number and communicates the finding to the dual card sponsor Web site. See block 424. At block 426, the dual card sponsor Web site submits the dual card number, the access number, and the reload amount to the stored value processor 214. The method 400 then proceeds to block 428 where the stored value processor 214 updates a stored value account connected with a dual card 202 by the load amount. The dual card sponsor Web site submits a payment authorization request to the credit card processor 208. See block 430. At block 432, the credit card processor 208 processes the payment. The method 400 then terminates execution.

From terminal B2 (FIG. 4C), the method 400 proceeds to block 410 where the customer 222 asks a clerk, such as a barista in a coffee store, to load the stored value account of the dual card 202 with an amount of money. The clerk selects a reload transaction at a point-of-sale machine, such as the point-of-sale machine 204b-1. See block 412. At block 414, the clerk enters an amount to be loaded using the point-of-sale machine 204b-1. The method 400 then proceeds to block 416 where the clerk swipes the dual card 202 through the point-of-sale machine 204b-1.

A test is made to determine whether the dual card 202 number is within a valid range associated with dual cards. See decision block 418. If the answer to the test at decision block 418 is NO, at block 420, the point-of-sale machine 204b-1 notifies the clerk that the dual card 202 is not valid for loading the amount of money. The method 400 then loops back to block 410 where the above-identified processing steps are repeated. If the answer to the test at decision block 418 is YES, another continuation terminal ("terminal B3") is entered by the method 418.

From terminal B3 (FIG. 4D), the method 400 proceeds to block 434 where the point-of-sale machine 204b-1 forwards the load transaction to the stored value processor 214 for processing. The customer 222 pays for the load transaction by having the clerk swipe the dual card 202 or via any other payment types at the point-of-sale machine 204b-1. See block 436. At block 438, the payment is processed. (If the payment is by a credit card, the payment is processed by the credit card processor 208.) The method 400 then proceeds to block 440 where the point-of-sale machine 204b-1 prints a receipt. The clerk gives the customer 222 the receipt, which shows the new value of the stored value account connected with a dual card 202. See block 442. The method 400 then terminates execution.

Figure 5:
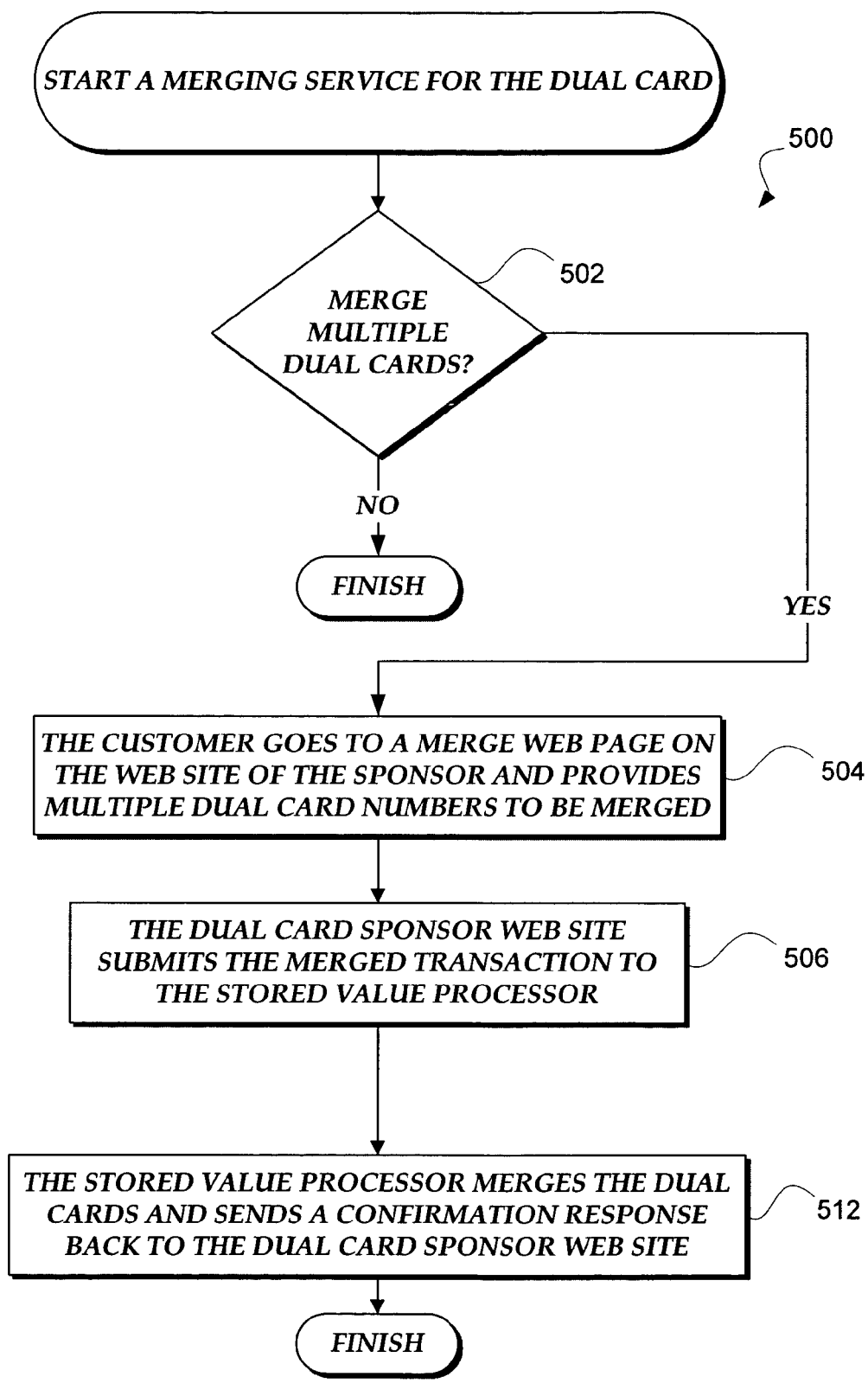
FIG. 5 is a process diagram illustrating a method for merging dual cards, according to one embodiment of the present invention.

FIG. 5 illustrates a method 500 for providing a merging service for the dual card 202. From a start block (FIG. 5), the method 500 proceeds to decision block 502 where a test is made to determine whether the customer 222 wishes to merge multiple dual cards. If the answer to the test at decision block 502 is NO, the method 500 terminates execution. Otherwise, if the answer to the test at decision block 502 is YES, the customer 222 goes to a merge Web page on the Web site of the sponsor business and provides multiple dual card numbers to be merged. See block 504. At block 506, the dual card sponsor Web site submits the merged transaction to the stored value processor 214. The store value processor 214 merges the dual cards and sends a confirmation response back to the dual card sponsor Web site. See block 512. The method 500 then terminates execution.

Figure 6A:
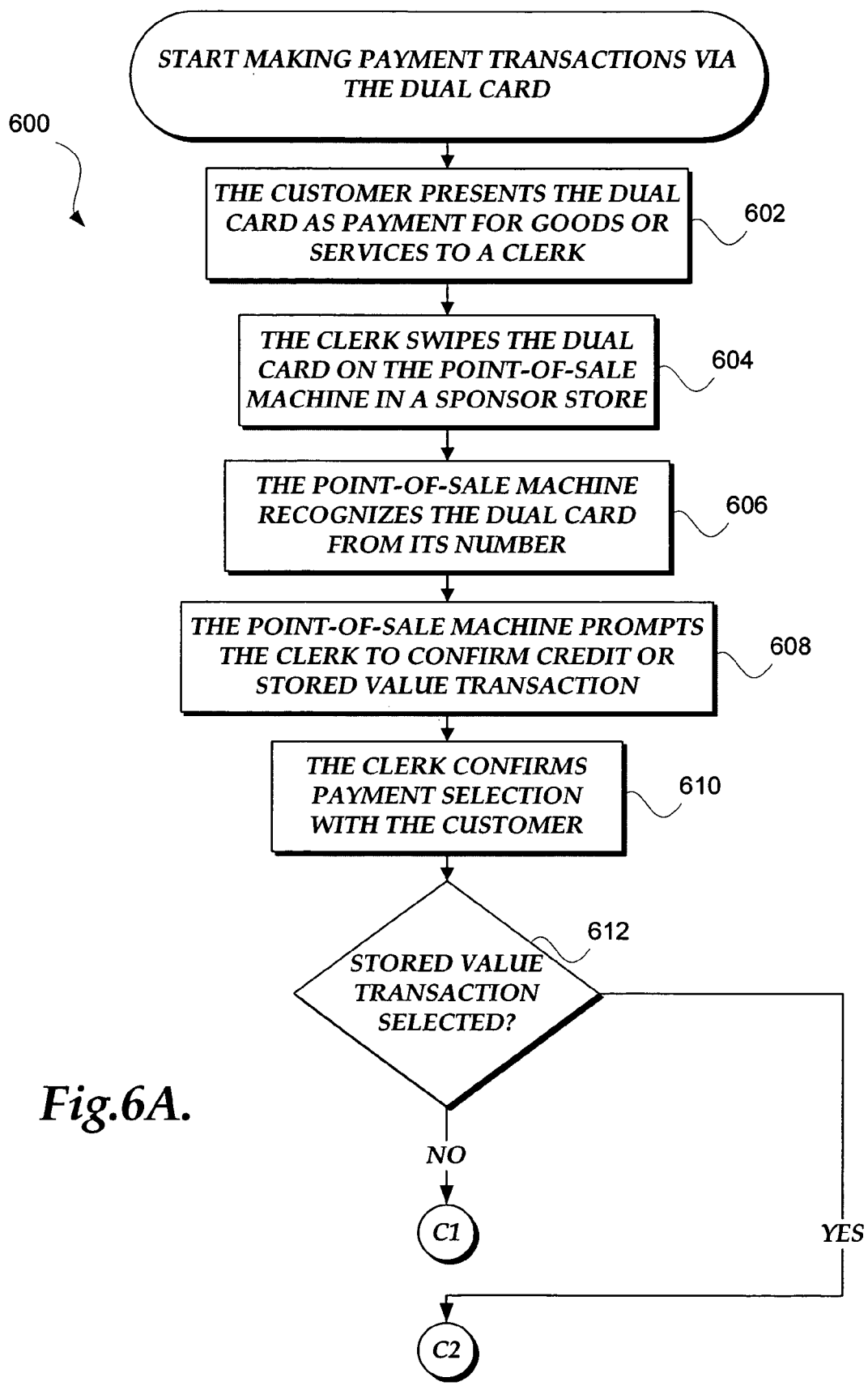
FIGS. 6A-6C are process diagrams illustrating a method for making payment transactions via a dual card, according to one embodiment of the present invention.
Figure 6B:
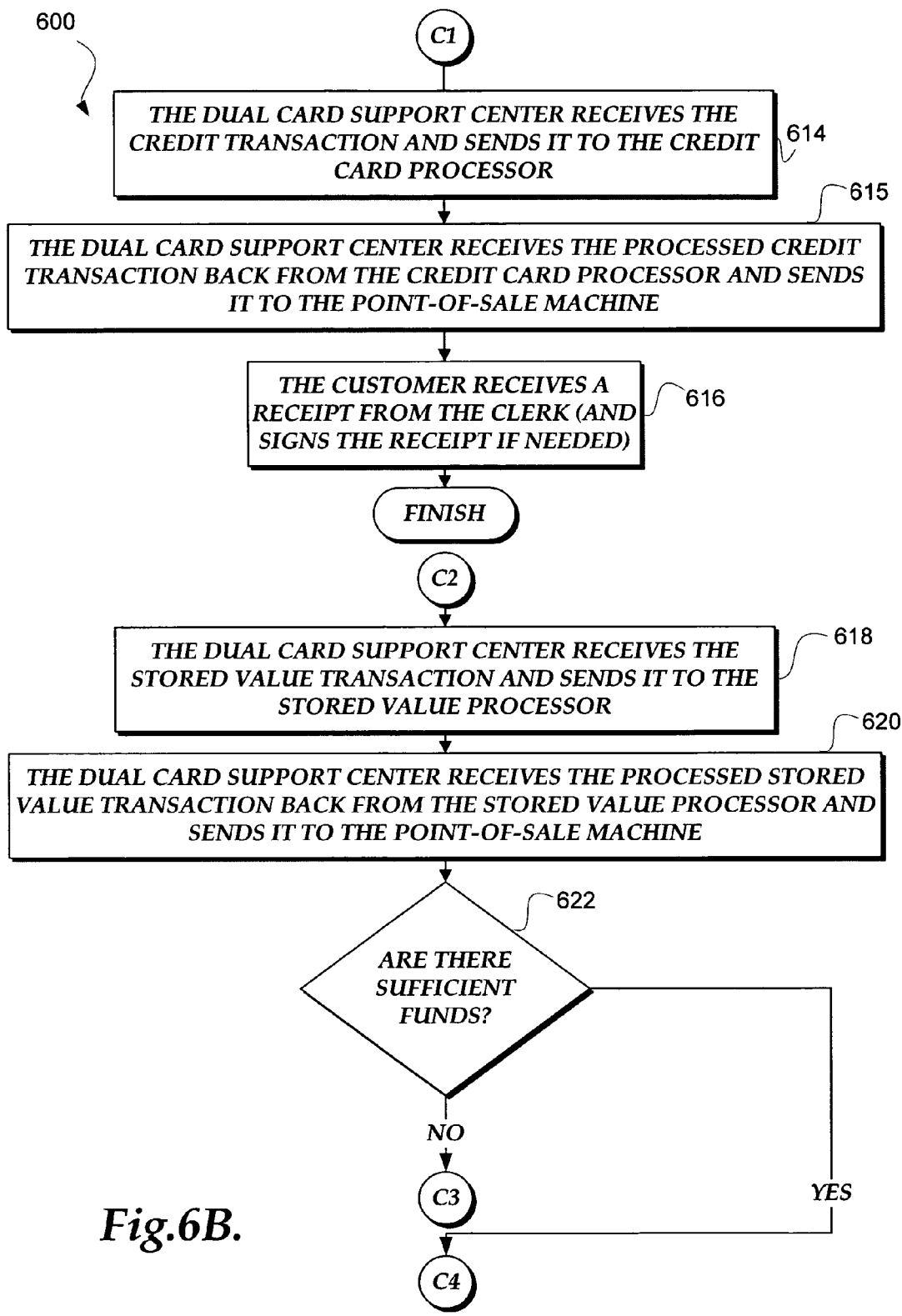
Figure 6C:
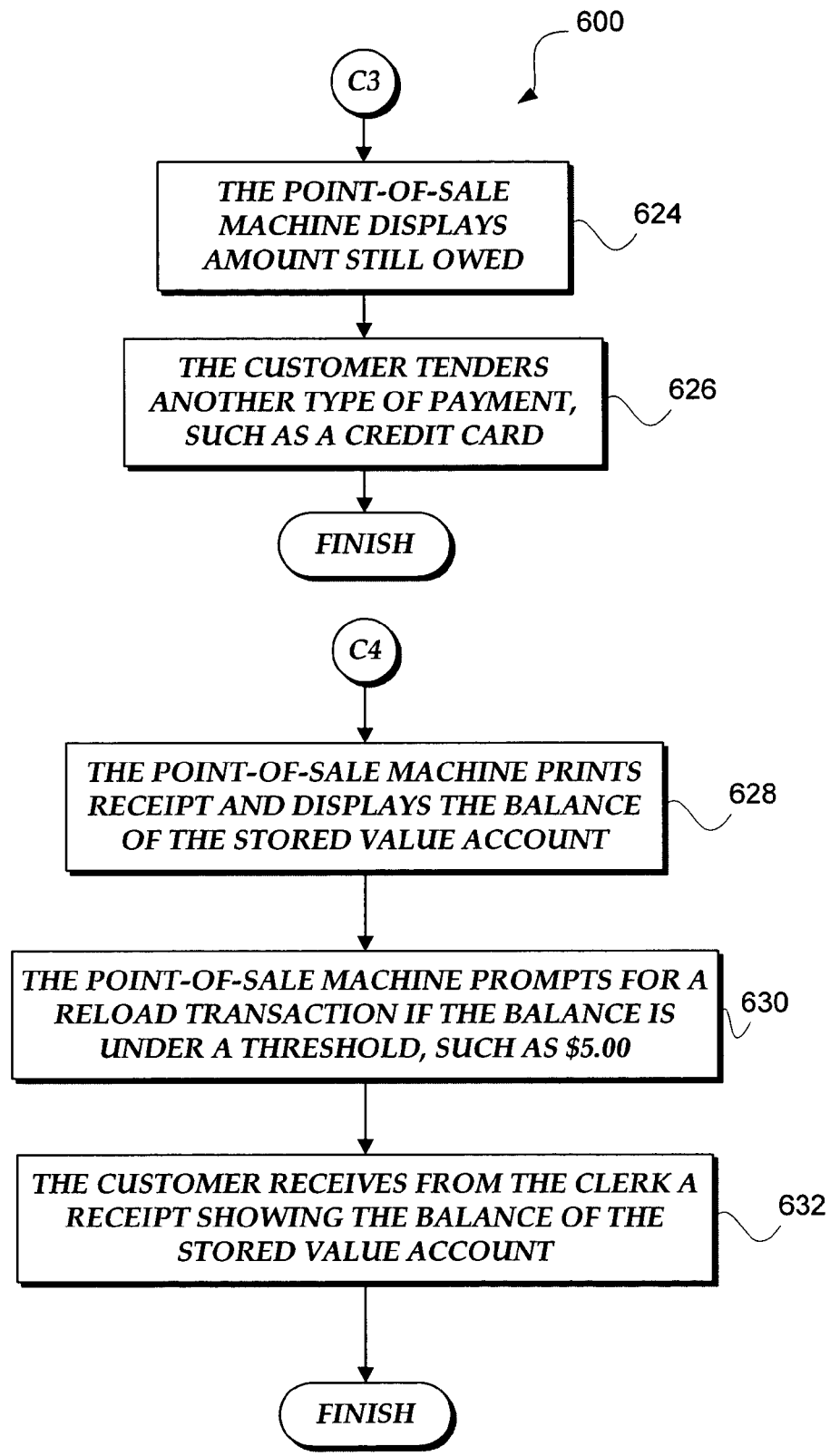

FIGS. 6A-6C illustrate a method 600 for making payment transactions via the dual card 202. From a start block (FIG. 6A), the method 600 proceeds to block 602 where the customer 222 presents the dual card 202 as payment for goods or services to a clerk. The clerk swipes the dual card 202 on the point-of-sale machine 204b-1 in the sponsor store 204b. See block 604. At block 606, the point-of-sale machine 204b-1 recognizes the dual card 202 from its identification number. The method 600 proceeds to block 608 where the point-of-sale machine 204b-1 prompts the clerk to confirm a credit or stored value transaction as payment. The clerk confirms payment selection with a customer 222. See block 610. At decision block 612, a test is made to determine whether the stored value transaction was selected. If the answer to the test at decision block 612 is NO, the method 600 enters another continuation terminal ("terminal C1"). Otherwise, the answer to the test at decision block 612 is YES, and the method 600 enters another continuation terminal ("terminal C2").

From terminal C1 (FIG. 6B), the method 600 proceeds to block 614 where the dual card support center 212 receives the credit transaction and sends the credit transaction to the credit card processor 208. The dual card support center 212 receives the processed credit transaction from the credit card processor 208 and sends the credit transaction to the point-of-sale machine 204b-1. See block 620. The method 600 proceeds to block 616 where the customer 222 receives a receipt from the clerk (and signs the receipt if needed). The method 600 terminates execution.

From terminal C2 (FIG. 6B), the method 600 proceeds to block 618 where the dual card support center 212 receives the stored value transaction and sends the stored value transaction to the stored value processor 214. The dual card support center 212 receives the processed stored value transaction from the stored value processor 214 and sends the stored value transaction to the point-of-sale machine 204b-1. See block 620. At decision block 622, a test is made to determine whether there are sufficient funds. If the answer to the test at decision block 622 is NO, the method 600 enters another continuation terminal ("terminal C3"). Otherwise, the answer to the test at decision block 622 is YES, and the method 600 proceeds to another continuation terminal ("terminal C4").

From terminal C3 (FIG. 6C), the method 600 continues to block 624 where the point-of-sale machine 204b-1 displays amounts still owed. The customer tenders another type of payment, such as a credit card, to pay for the amount owed. See block 626. The method 600 then terminates execution.

From terminal C4 (FIG. 6C), the point-of-sale machine 204b-1 prints a receipt and displays the balance of the stored value account. See block 628. At block 630, the point-of-sale machine 204b-1 prompts for a reload transaction if the balance is under a threshold, such as five dollars. See block 630. The method 600 proceeds to block 632 where the customer 222 receives from the clerk a receipt showing the balance of the stored value account. The method 600 then terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for making payment transactions, the computer-implemented method comprising:
   receiving identification information from a payment card to pay for goods or services;
   recognizing the payment card as a dual card based on the identification information, wherein the dual card is associated with a credit account maintained on behalf of a first entity and a stored value account maintained on behalf of a second entity, wherein the identification information distinguishes the dual card from a credit card and a stored value card, wherein the credit account is maintained separately and is distinct from the stored value account, and wherein the stored value account stores a monetary value that cannot be withdrawn as cash, but can be used to pay for goods or services;

prompting to confirm whether a credit or stored value transaction is desired;

upon selection of a credit transaction, routing the payment transaction to a credit card processor where the payment transaction is processed as a credit transaction on behalf of the first entity; and upon selection of a stored value transaction, routing the payment transaction to a store value processor where the payment transaction in processed as a stored value transaction on behalf of the second entity.

2. The computer-implemented method of claim 1, further comprising prompting for additional payment if there is insufficient credit in the credit account or value in the stored value account.

3. The computer-implemented method of claim 1, further comprising prompting for a reload transaction to replenish the stored value account if the stored value account is under a threshold.

4. The computer-implemented method of claim 1, wherein the payment card is recognized as a dual card from the identification information falling within a predetermined range.

5. A system for processing payment transactions conducted using a dual card, the system comprising:

a computing device that determines whether the payment transaction conducted using the dual card is a credit transaction for a credit account associated with the dual card or a stored value transaction for a stored value account associated with the dual card, wherein the dual card is associated with identification information that distinguishes the dual card from a credit card and a stored value card, wherein the credit account associated with the dual card is distinct from the stored value account associated with the dual card, and wherein the stored value account stores a monetary value which cannot be withdrawn as cash; and a transaction router in communication with the computing device that:

communicates the payment transaction over a closed network for processing on behalf of a first entity associated with stored value transactions, if the computing device determines that the payment transaction is a stored value transaction; and communicates the payment transaction over an open network for processing on behalf of a second entity associated with credit transactions, if the computing device determines that the payment transaction is a credit transaction.

6. The system of claim 5, wherein the computing device determines whether the payment transaction conducted using the dual card is a credit transaction or a stored value transaction by:

identifying the dual card from the identification information associated with the dual card; and following identification of the dual card, requesting confirmation that the payment transaction is a credit transaction or a stored value transaction.

7. The system of claim 5, wherein the dual card is used to conduct payment transactions that are stored value transactions in establishments sponsored by the first entity.

8. The system of claim 5, wherein the dual card is used to conduct payment transactions that are credit transactions in establishments sponsored by the first entity and in third party establishments.

9. A non-transitory computer-readable medium having computer-executable components for communicating payment transactions conducted using a dual card, the computer-executable components comprising:

an identification component that, when executed, causes one or more computing devices to identify the dual card as distinguished from a credit card and a stored value card, wherein the identification component is operative to identify the dual card as distinguished from a credit card and a stored value card from identification information associated with the dual card falling within a predetermined numerical range; and a routing component that, when executed, causes one or more computing devices to:

communicate the payment transaction over a closed network for processing on behalf of a first entity associated with stored value transactions, if it is determined that the payment transaction is a stored value transaction for a stored value account associated with the dual card, wherein the stored value account stores a monetary value which cannot be withdrawn as cash; and communicate the payment transaction over an open network for processing on behalf of a second entity associated with credit transactions, if it is determined that the payment transaction is a credit transaction for a credit account associated with the dual card, wherein the credit account associated with the dual card is distinct from the stored value account associated with the dual card.

10. The system of claim 9, wherein the identification component, when executed, further causes the one or more computing devices to request confirmation that the payment transaction conducted using the dual card is a credit transaction or a stored value transaction.

11. The system of claim 9, wherein the dual card is used to conduct payment transactions that are stored value transactions from establishments sponsored by the first entity.

12. The system of claim 11, wherein the dual card is used to conduct payment transactions that are credit transactions from establishments sponsored by the first entity and in third party establishments.

* * * * *